(12) United States Patent
Eggum

(10) Patent No.: US 7,115,335 B2
(45) Date of Patent: Oct. 3, 2006

(54) CONNECTOR ASSEMBLY FOR FLUID TRANSFER

(75) Inventor: Shawn D. Eggum, Lonsdale, MN (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 10/977,511

(22) Filed: Oct. 29, 2004

(65) Prior Publication Data

US 2005/0147864 A1   Jul. 7, 2005

Related U.S. Application Data

(60) Provisional application No. 60/516,121, filed on Oct. 31, 2003.

(51) Int. Cl.
*H01M 8/04* (2006.01)
(52) U.S. Cl. ...................................... 429/34
(58) Field of Classification Search ............... None
See application file for complete search history.

(56) References Cited

U.S. PATENT DOCUMENTS

| 4,436,125 | A |   | 3/1984  | Blenkush |
|-----------|---|---|---------|----------|
| 4,909,289 | A |   | 3/1990  | Hagan et al. |
| 4,924,849 | A | * | 5/1990  | Zaborowski ............. 126/409 |
| 5,595,217 | A |   | 1/1997  | Gillen et al. |
| 6,180,272 | B1 |  | 1/2001  | Byrne et al. |
| 6,387,559 | B1 |  | 5/2002  | Koripella et al. |
| 6,419,699 | B1 |  | 7/2002  | Schuessler |
| 6,460,733 | B1 |  | 10/2002 | Acker et al. |
| 6,506,513 | B1 |  | 1/2003  | Yonetsu et al. |
| 2002/0127141 | A1 | | 9/2002 | Acker |
| 2002/0197522 | A1 | * | 12/2002 | Lawrence et al. ............. 429/34 |
| 2003/0082416 | A1 | | 5/2003 | Bullock et al. |
| 2003/0082421 | A1 | | 5/2003 | Yonetsu et al. |
| 2003/0082426 | A1 | | 5/2003 | Bullock et al. |
| 2003/0102664 | A1 | | 6/2003 | Novotny |
| 2003/0129464 | A1 | | 7/2003 | Becerra et al. |
| 2003/0138679 | A1 | | 7/2003 | Prased et al. |
| 2004/0072049 | A1 | | 4/2004 | Becerra et al. |

FOREIGN PATENT DOCUMENTS

| WO | WO 99/67169 | 12/1999 |
|----|-------------|---------|
| WO | WO 02/077511 | 10/2002 |

* cited by examiner

*Primary Examiner*—Michael Barr
*Assistant Examiner*—Robert Hodge
(74) *Attorney, Agent, or Firm*—Patterson, Thuente, Skaar & Christensen, P.A.

(57) ABSTRACT

A fuel cell system has an improved connector assembly to provide for the quick connection of a fuel cartridge and the fuel cell. Two leak resistant connector members with an easy to engage coupling mechanism that stably grips the two connector members to provide for flow between the members. The first connector member is adapted to engage the second connector member to form a unitary structure, which can establish fluid communication between the connector members. Generally, both the first connector member and the second connector member comprise a fluid flow path that can be each sealed/unsealed by a poppet valve or other suitable valve members. In some embodiments, the connector members can be engaged/disengaged by rotating an element of the coupling mechanism. The connector assemblies can be particularly useful for the connection of a fuel cell with a fuel cartridge.

11 Claims, 13 Drawing Sheets

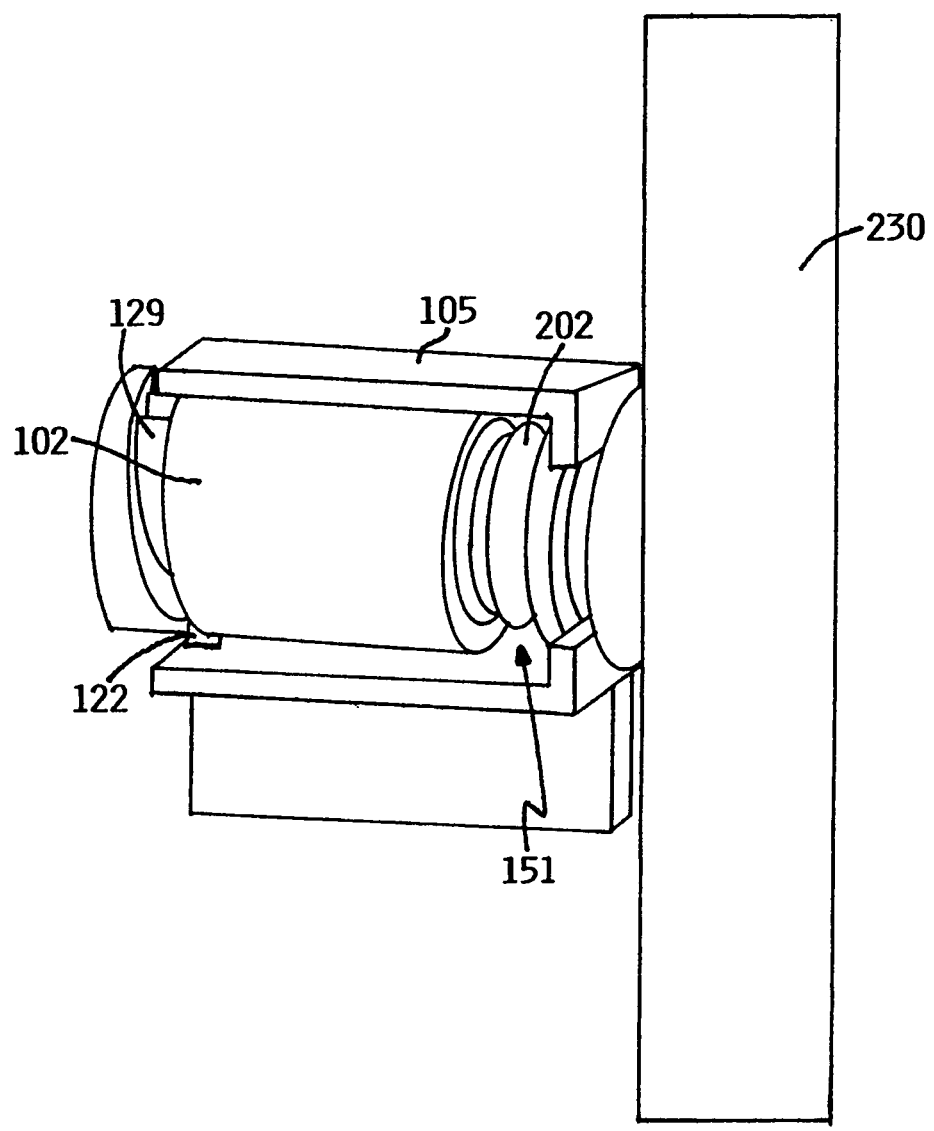
FIG. IC

CONNECTOR ASSEMBLY FOR FLUID TRANSFER

CROSS-REFERENCE TO RELATED APPLICATIONS

The current application claims the benefit of priority from U.S. provisional patent application filed on Oct. 31, 2003, entitled "Connector Assembly for Fluid Transfer," having Ser. No. 60/516,121, which is incorporated herein by reference.

FIELD OF THE INVENTION

The invention relates to connector assemblies for fluid transfer applications, especially for use in fuel cells. In particular, the invention relates to connector assemblies having a first connector adapted to engage a second connector to establish fluid communication between the first connector and the second connector, in which the first connector and second connector generally have a leak preventing configuration when not engaged together.

BACKGROUND OF THE INVENTION

In general, a fuel cell is an electrochemical device that can convent energy stored in fuels such as hydrogen, methane, methanol and the like, into electricity without combustion of the fuel. A fuel cell generally comprises a negative electrode, a positive electrode, and a separator within an appropriate container. Fuel cells operate by utilizing chemical reactions that occur at each electrode. In general, electrons are generated at one electrode and flow through an external circuit to the other electrode where they are consumed. This flow of electrons creates an over-voltage between the two electrodes that can be used to drive useful work in the external circuit. In commercial embodiments, several "fuel cells" are usually arranged in series, or stacked, in order to create larger over-potentials.

A fuel cell is similar to a battery in that both generally have a positive electrode, a negative electrode and electrolytes. However, a fuel cell is different from a battery in the sense that the fuel in a fuel cell can be replaced without disassembling the cell to keep the cell operating. Additionally, fuel cells can have several advantages over other sources of power that make them attractive alternatives to traditional energy sources. Specifically, fuel cells are environmentally friendly, efficient and utilize convenient fuel sources, for example, hydrogen or methanol.

Fuel cells have potential uses in a number of commercial applications and industries. For example, fuel cells are being developed that can provide sufficient power to meet the energy demands of a single family home. In addition, prototype cars have been developed that run off of energy derived from fuel cells. Furthermore, fuel cells can be used to power portable electronic devices such as computers, phones, video projection equipment and the like. Fuel cells designed for use with portable electronic equipment provide an alternative to battery power with the ability to replace the fuel without replacing the whole cell. Additionally, fuel cells can have longer power cycles and no down time for recharging, which also makes fuel cells an attractive alternative to battery power for portable electronics.

As described above, fuel cells are becoming an increasingly attractive alternative to traditional energy sources such as batteries and fuel combustion. For example, fuel cells are currently being developed to power portable electronic devices such as, for example, laptop computers, video projection equipment and the like. It may be convenient for fuel cells designed for use with portable electronic devices to be compatible with portable and interchangeable fuel containers, which permit empty or partially empty fuel containers to be replaced in order to keep the fuel cell, and ultimately the portable electronic device, operating. In some embodiments, these fuel cells are designed to use liquid fuels such as, for example, methanol, although they can use other fluid fuels, such as compressed hydrogen or methane.

Generally, fuel containers or fuel cartridges suitable for use with portable electronic devices comprise a storage structure having a suitable fuel located therein. Additionally, these fuel containers can further comprise a passage which provides access to the interior of the container or cartridge. In some embodiments, the pass is coupled to a connector that is adapted to couple with a fuel inlet port on a portable fuel cell to establish fluid communication between the fuel cell and the fuel container once appropriate valves or other control element are opened. In one embodiment, fuel containers suitable for use with fuel cells designed for portable electronic devices can comprise a rigid outer container associated with a flexible inner container in which a fluid such as, for example, methanol is stored. In some embodiments, these types of fuel containers can further comprise a port in the outer container which allows transport of the filled inner container into the outer container. These types of fuel containers are described in, for example, commonly assigned and co-pending U.S. patent application Ser. No. 10/384,382, filed on Mar. 7, 2003, entitled "Fuel Storage Container For A Fuel Cell," which is hereby incorporated by reference herein. In addition, methanol, and other organic fluids suitable for use in fuel cell applications, are generally environmental pollutants and flammable and, therefore, can present safety and other release issues. As a result, it may be desirable to reduce the amount of potential fluid leakage during engagement of the fuel container with the fuel cell, while still maintaining the ability to quickly connect and disconnect the containers from the fuel cell.

SUMMARY OF THE INVENTION

A fuel cell system has an improved connector assembly to provide for the quick connection of a fuel cartridge and the fuel cell. Two leak resistant connector members with an easy to engage coupling mechanism that stably grips the two connector members to provide for flow between the members. The first connector member is adapted to engage the second connector member to form a unitary structure, which can establish fluid communication between the connector members. Generally, both the first connector member and the second connector member comprise a fluid flow path that can be each sealed/unsealed by respective poppet valves or other suitable valve members. Due to the presence of the coupling structure, the first connector member and the second connector member can be engaged and unsealed simultaneously, which facilitates quick connection of the connector structures and also reduces fluid leakage prior to engagement of the connector members. Similarly, the coupling mechanism can also enable the simultaneous sealing and disengagement of the connector members. In some embodiments, the connector members can be engaged/disengaged by rotating an element of the coupling mechanism.

The invention reduces the amount of fluid leakage during replacement of the fuel container while still maintaining quick connect ability is to employ a connector system having a coupling mechanism which permits simultaneous unsealing and engagement of the connector elements. Additionally, the coupling mechanism can also simultaneously seal and disengage the connector elements.

Generally, the connector systems of the present disclosure comprise connector elements associated with a coupling mechanism. The connector elements each have a fluid flow path that can be sealed and unsealed with a valve member. In some embodiments, the connector mechanism is adapted to engage the connector elements to form a unitary structure. Additionally, the connector system can be designed such that engagement of the connector elements, via actuation of the coupling mechanism, simultaneously unseals the connector elements by appropriate movement of the valve member and establishes fluid communication between the connector elements. Similarly, disengagement of the connector elements can simultaneously seal the connector elements and prohibit fluid flow through the connector elements.

In some embodiments, the coupling mechanism can be designed to engage the connector elements, such that the connector elements can be inserted into the coupling mechanism prior to engagement of the connector members. In other embodiments, the coupling mechanism can be part of one of the connector elements and can comprise structure for receiving a second connector element. Additionally, the coupling mechanism can comprise application specific keying structures that connect with matched structures on the connector elements such that only specific connector elements can be engaged by the coupling mechanism.

In the preferred embodiment, the invention pertains to a fuel cell system comprising an electrochemical cell having a cathode, an anode and a fuel inlet, wherein the fuel inlet provides a pathway for fuel to the anode. The fuel cell system can further comprise a first connector coupled to the fuel inlet, the first connector having a first fluid flow path through the first connector and a first valve biased towards a sealing position within the first fluid flow path. A second connector having a second fluid flow path through the second connector and a second valve biased towards a sealing position within the second fluid flow path, wherein the first connector is adapted to engage the second connector to provide fluid communication between the first connector and the second connector.

In another aspect, the invention relates to a connector comprising a first connector member having coupling mechanism, and a second connector member. In these embodiments, the first connector member can comprise a first body portion having a first bore defining a fluid flow path through the first connector member, a first valve moveable within the first bore from a sealed position to an unsealed position, a first resilient member connected to the first valve biasing the first valve toward the sealing position within the first bore, and a coupling mechanism having a first engagement element and a second engagement element, wherein the first engagement element is a adapted to engage the first connector member. The coupling mechanism can have a first engagement position and a second engagement position relative to the first body and wherein the coupling mechanism moves between the first engagement position and the second engagement position upon actuation of the coupling mechanism. Additionally, in these embodiments, the second connector can comprise a second body portion having a second bore defining a fluid flow path through the second connector element, a second valve moveable within the second bore from a sealed position to an unsealed position, a second resilient member connected to the second valve biasing the second valve toward the sealing position within the second bore, wherein the second connector member is adapted to engage the first connector member. In these embodiments, the second engagement element is adapted to engage the second connector member. In some embodiments, actuation of the coupling mechanism engages the first connector member and the second connector member and moves the first valve and the second valve into the unsealed position such that fluid communication is established between the first connector and the second connector.

In another embodiment, the invention pertains to a method of establishing fluid communication comprising associating a first connector comprising a first valve, a second connector comprising a second valve and a coupling mechanism, wherein the first and second valves can move from a sealed position to an unsealed position. In these embodiments, the first connector and the second connector are adapted to engage the coupling mechanism, and actuation of the coupling mechanism engages the first connector and the second connector and establishes fluid communication between the first connector and the second connector by moving the first valve and the second valve to the unsealed position. In these embodiments, the method further comprises actuating the coupling mechanism to engage the first connector and the second connector, which establishes fluid communication between the first connector and the second connector and unseals the first valve and the second valve.

In a further embodiment, the invention pertains to an apparatus comprising a fuel cell having an anode, a cathode and a fluid conduit connecting the a fuel inlet with the anode, wherein the first connector element connected to the fuel inlet and a fuel cartridge receiving portion. Additionally, the apparatus can comprise a fuel cartridge having a second connector element and a coupling mechanism attached to the fuel cell, wherein the coupling mechanism is adapted to receive the fuel cartridge, and wherein rotation of the coupling mechanism engages the first connector element and the connector element and establishes fluid communication between the first connector element and the second connector element; and wherein a fuel cartridge receiving portion is adapted to receive the fuel cartridge when the coupling mechanism has been rotated to engage the first connector element and the second connector element.

BRIEF DESCRIPTION OF THE FIGURES

FIG. 1C is a perspective view of an alternative embodiment of a coupling mechanism.

2 aligned within the coupling mechanism, the first connector member and the second connector member being in an engaged position.

Figure 2:
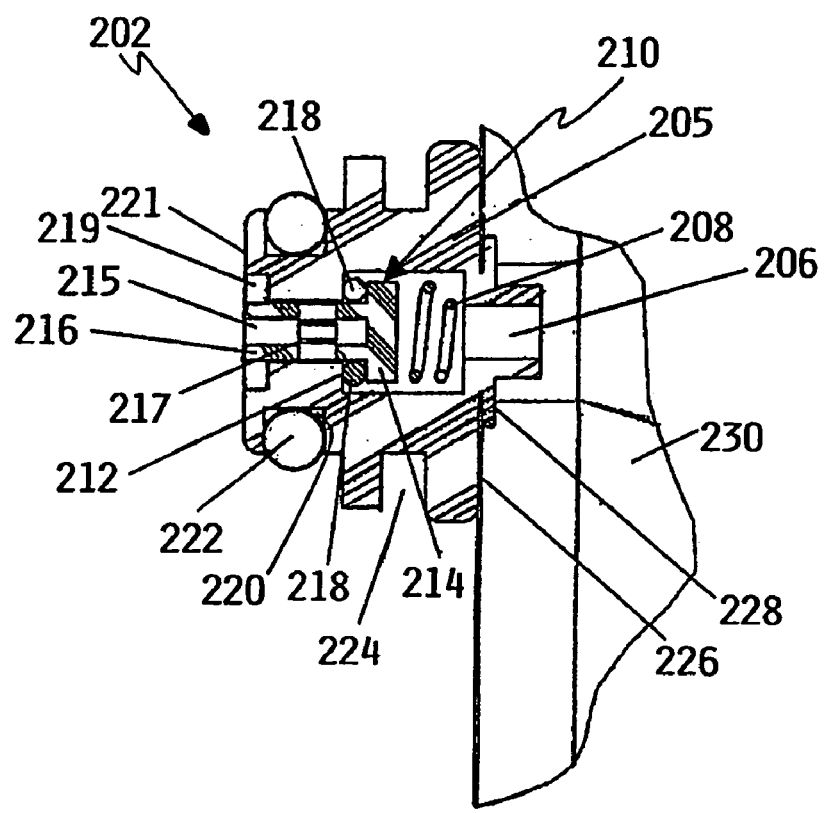
FIG. 2 is a sectional view of a second connector member coupled to a container, in which the cross section is taken through the center of the second connector member.
Figure 5A:
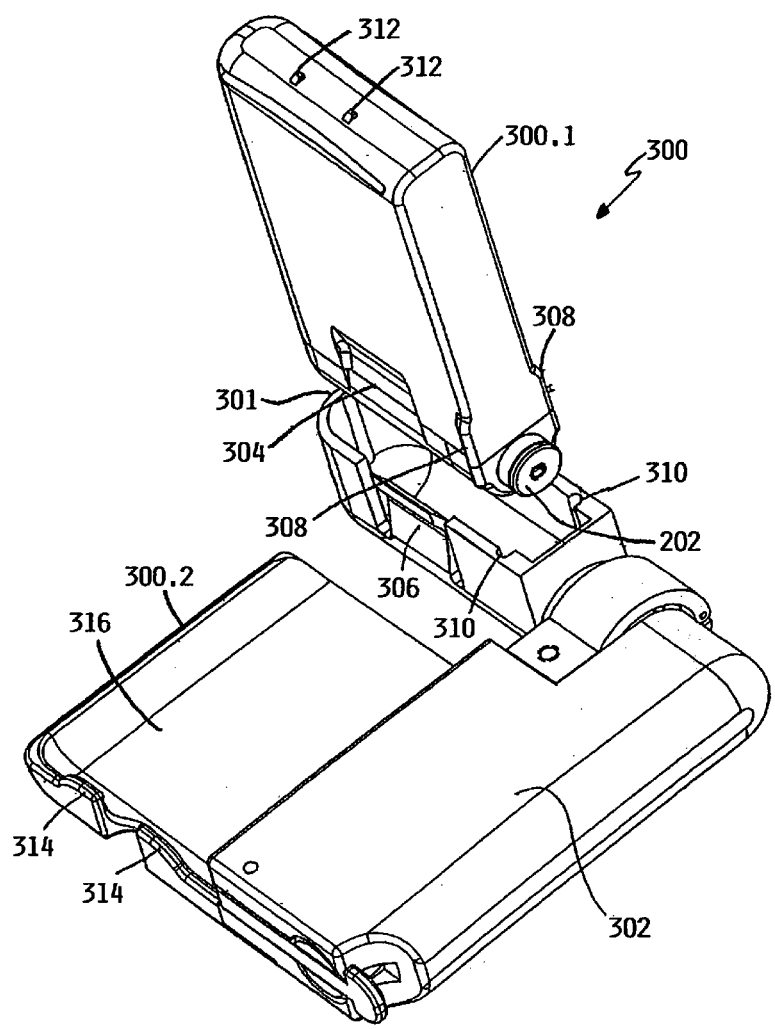

FIG. 5A is a perspective view of a cartridge comprising the connector member of FIG. 2. being inserted in to a coupling mechanism, wherein the coupling mechanism is attached to a fuel cell.

Figure 1:
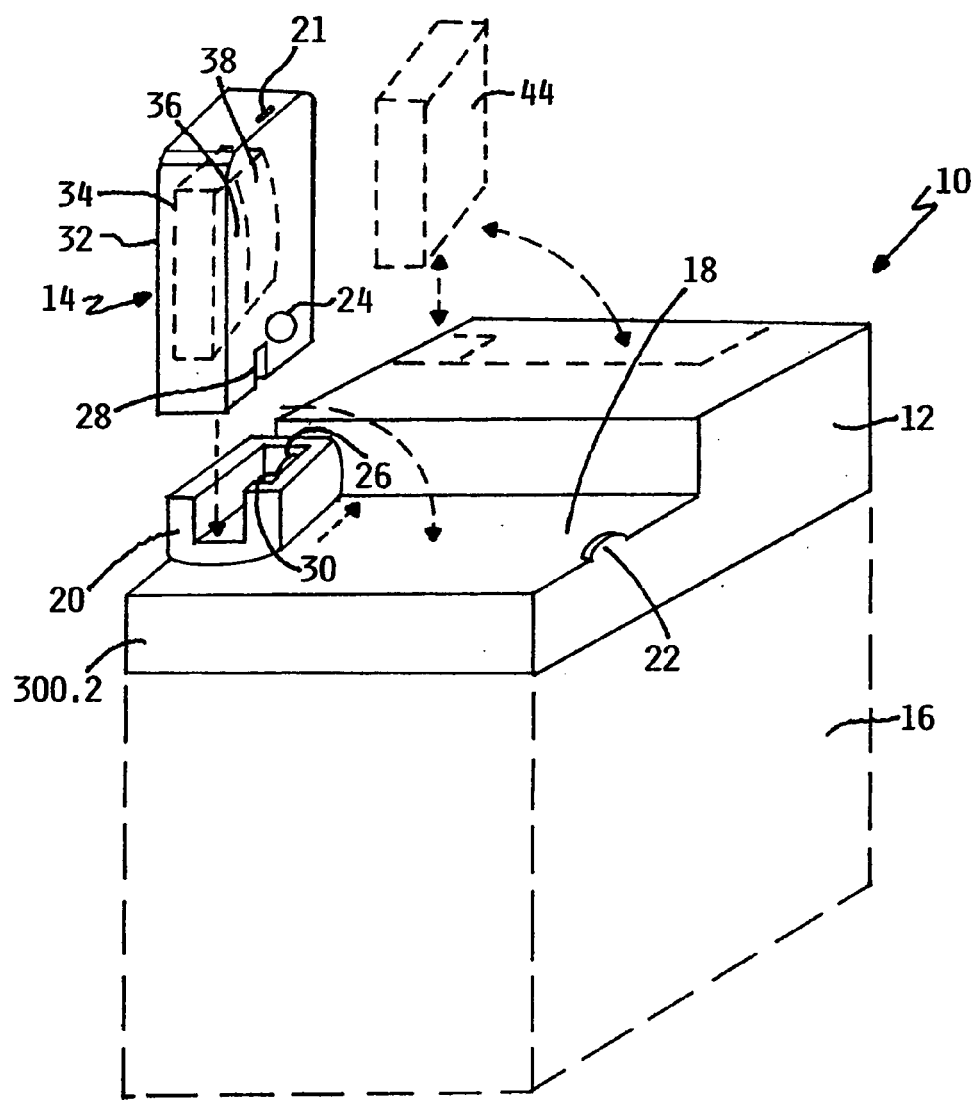
FIG. 1 is a perspective view of an apparatus comprising a fuel cell, a fuel cartridge and a device powered by the fuel cell.
Figure 5B:
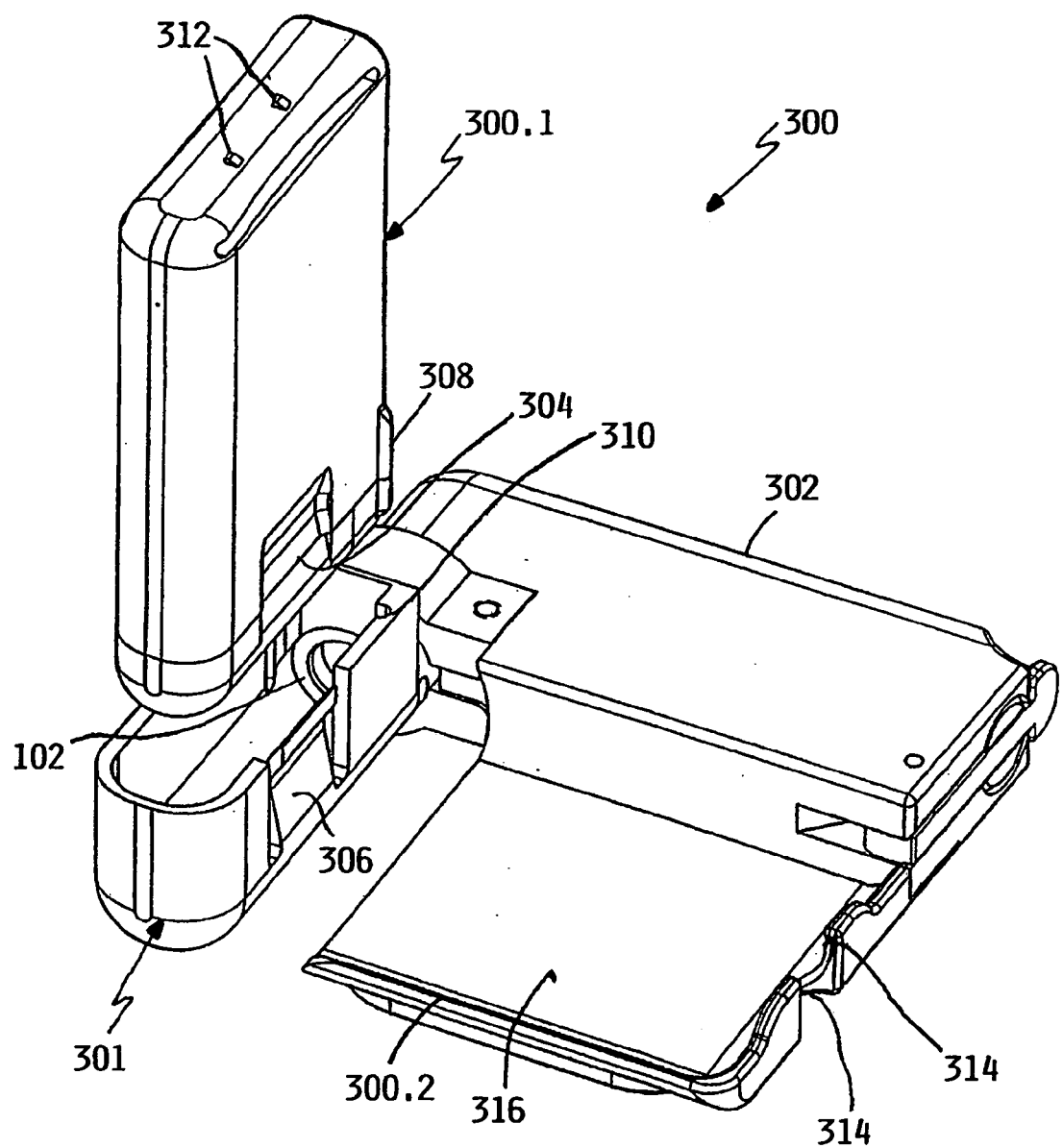

FIG. 5B is another perspective view of the cartridge of FIG. 5A showing the cartridge being inserted into a coupling mechanism comprising the connector member of FIG. 1.

Figure 6A:
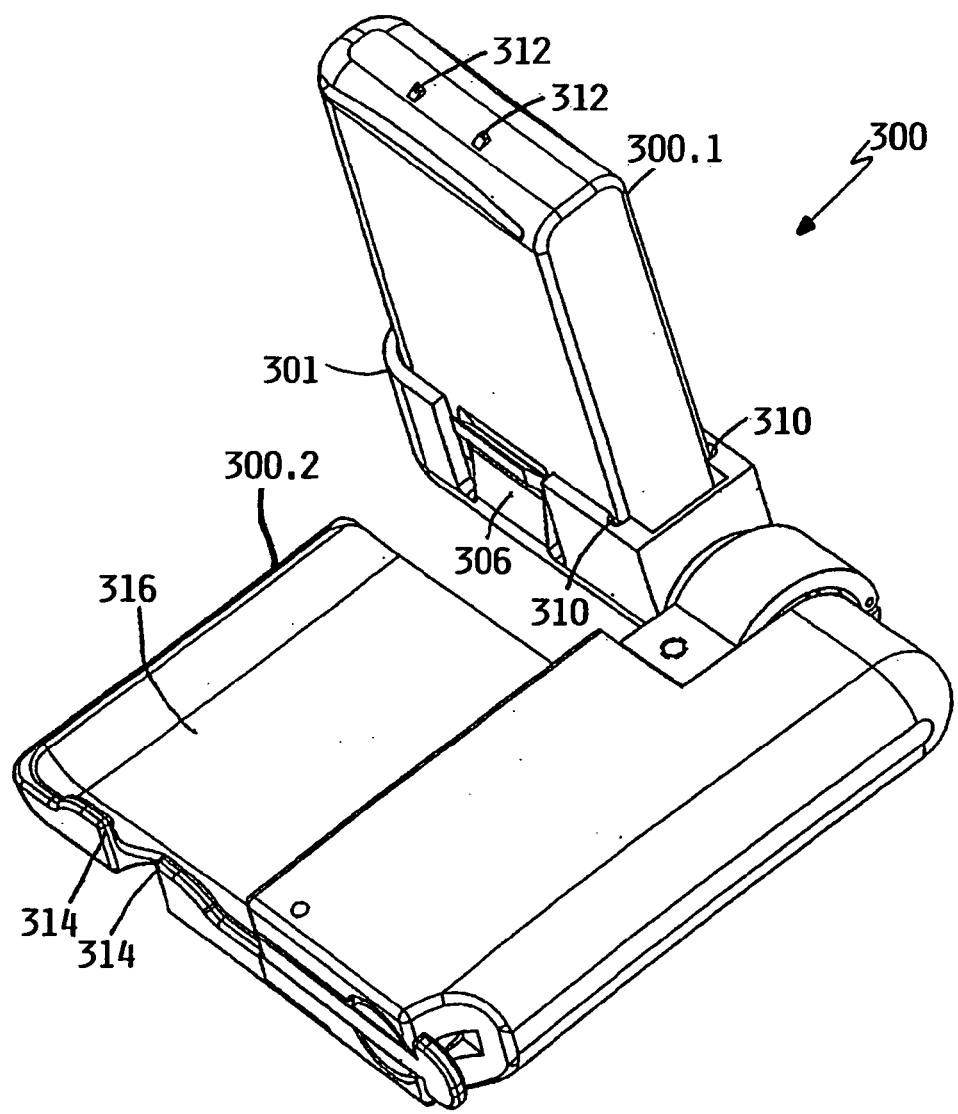

FIG. 6A is a perspective view of the cartridge of FIG. 5 inserted into the coupling mechanism.

Figure 6B:
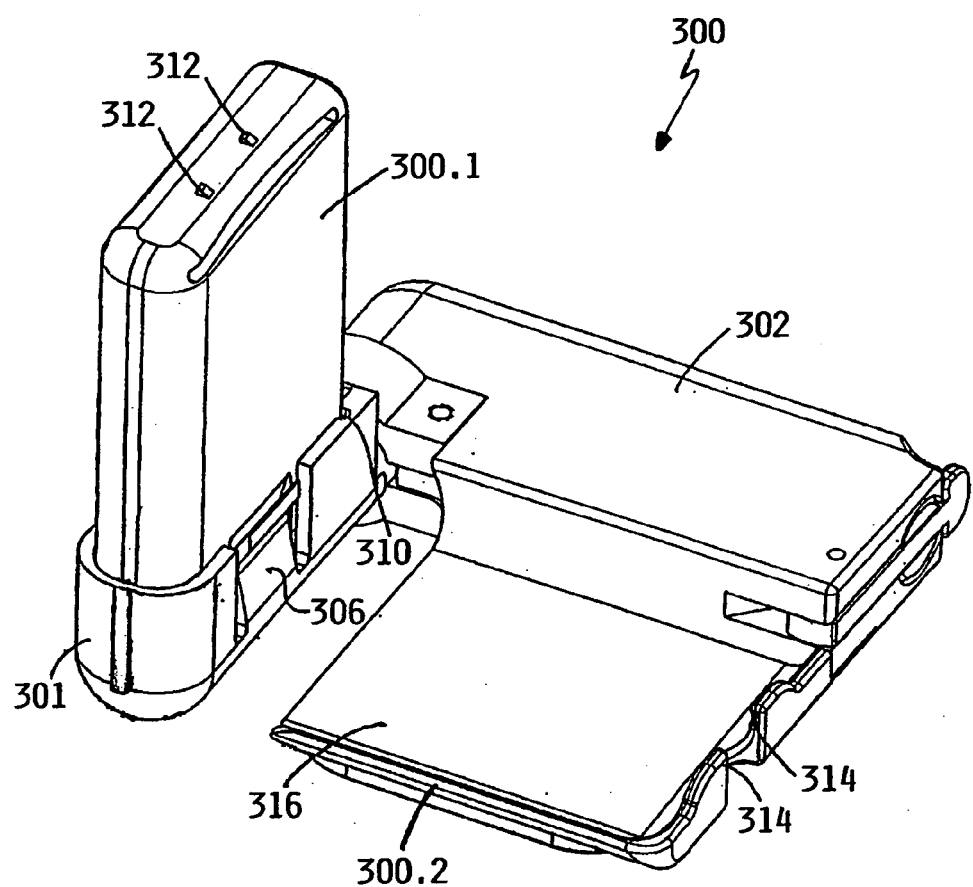

FIG. 6B is another perspective view of the combination in FIG. 6A with the cartridge of FIG. 5 inserted into the coupling mechanism.

Figure 7A:
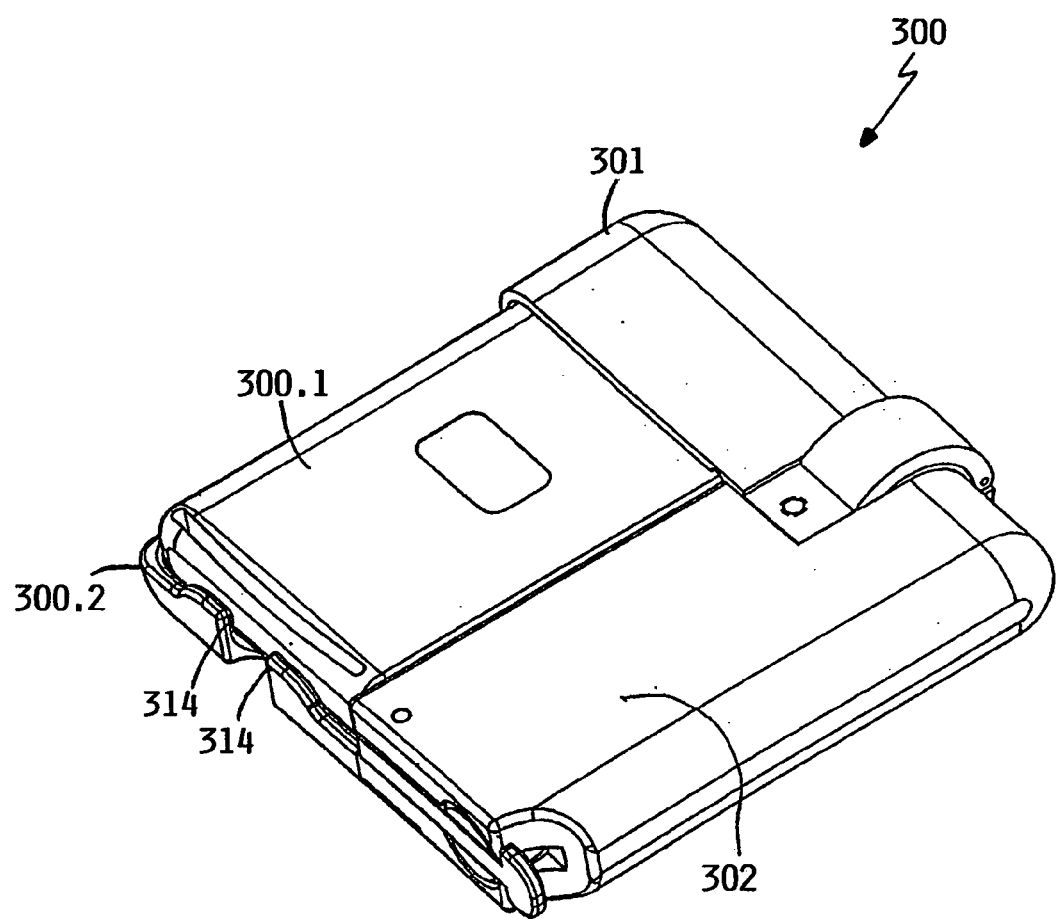

FIG. 7A is a perspective view of the cartridge of FIG. 5 after the cartridge has been inserted into the coupling mechanism and the coupling mechanism has been rotated to engage the connector members.

Figure 7B:
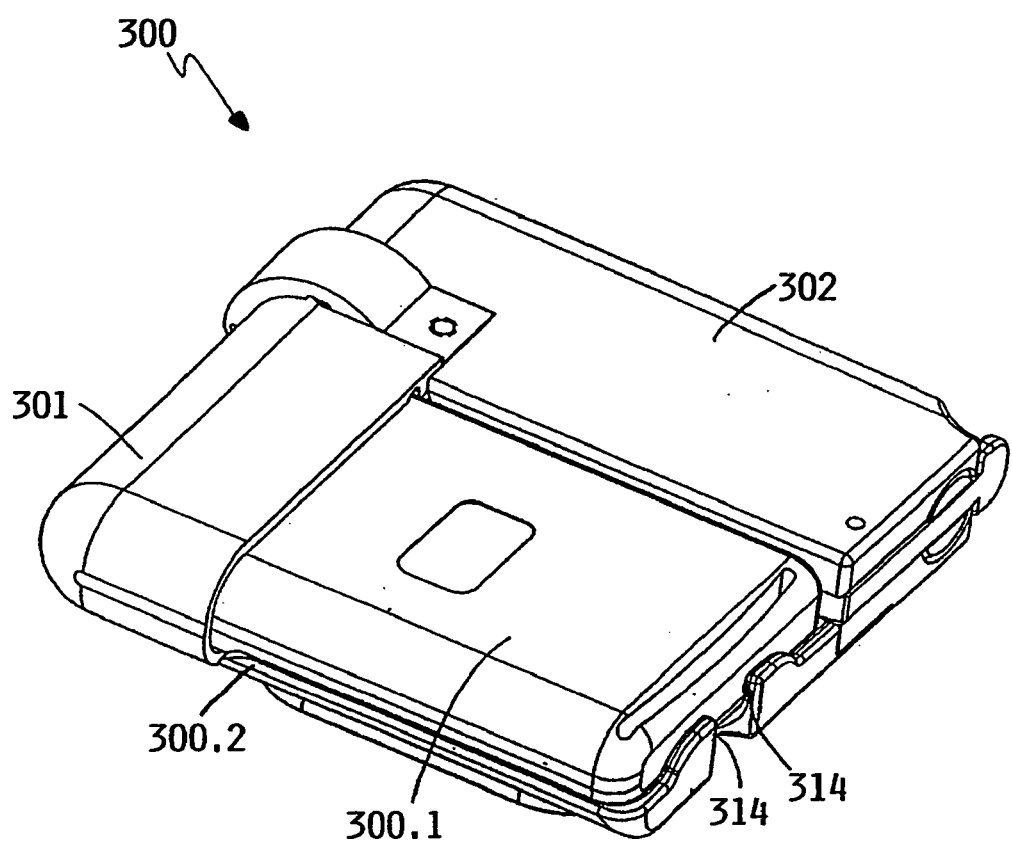

FIG. 7B is another perspective view of the combination of FIG. 7A with the cartridge of FIG. 5 after the cartridge has been inserted into the coupling mechanism and the coupling mechanism has been rotated to engage the connector members.

DETAILED DESCIRPTION OF PREFERRED EMBODIMENTS

Referring to FIG. 1, an apparatus 10 is depicted comprising fuel cell 12, fuel cartridge 14 and device 16 that can be powered by fuel cell 12. Fuel cell 12 can comprise cartridge receiving region 18, cartridge receiver or coupling mechanism 20 designed to engage and hold fuel cartridge 14, and cartridge latch 22 adapted to engage with connection portion 21 of fuel cartridge 14 to secure fuel cartridge 14 to the cartridge receiving region 18. As depicted in FIG. 1, cartridge receiver 20 can receive fuel cartridge 14 and can rotate up to about 90 degrees, which facilitates positioning fuel cartridge 14 in cartridge receiving region 18 of fuel cell 12. In some embodiments, fuel cartridge 14 can further comprise connector member 24, and fuel cell 12 can comprise connector member 26 that is adapted to engage with connector member 24. Generally, once fuel cartridge 14 has been engaged with cartridge receiver 20, rotation of cartridge receiver 20 can engage and unseal connector member 24 and connector member 26, which facilitates fluid transfer from fuel cartridge 14 to fuel cell 12. Suitable connector members are described in detail below.

In some embodiments, fuel cartridge 14 can comprise a keying structure 28 adapted to mate with a matched keying structure 30 located on cartridge receiver 20, which facilitates aligning and securing fuel cartridge 14 within cartridge receiver 20. In one embodiment, keying structure can comprise a notch, or recess, while keying structure 30 can comprise a protrusion sized to securely fit into the recess. Additionally, in some embodiments, fuel cartridge 14 can comprise a rigid outer container 32 and a flexible inner container 34 located within rigid outer container 32. In some embodiments, flexible inner bag can comprise a first compartment 36 and second compartment 38.

In some embodiments, fuel cell 12 can comprise a second cartridge receiver 40 and a second cartridge receiving region 42, which facilitates operably connecting a second cartridge 44 to fuel cell 12. In some embodiments, second cartridge 44 can be a fuel storage cartridge, while in other embodiments second cartridge 44 can be designed to collect water and/or other reactions products produced by fuel cell 12. Additionally or alternatively, water and/or other reaction products can be collected in second compartment 38 of fuel cartridge 14.

Figure 1A:
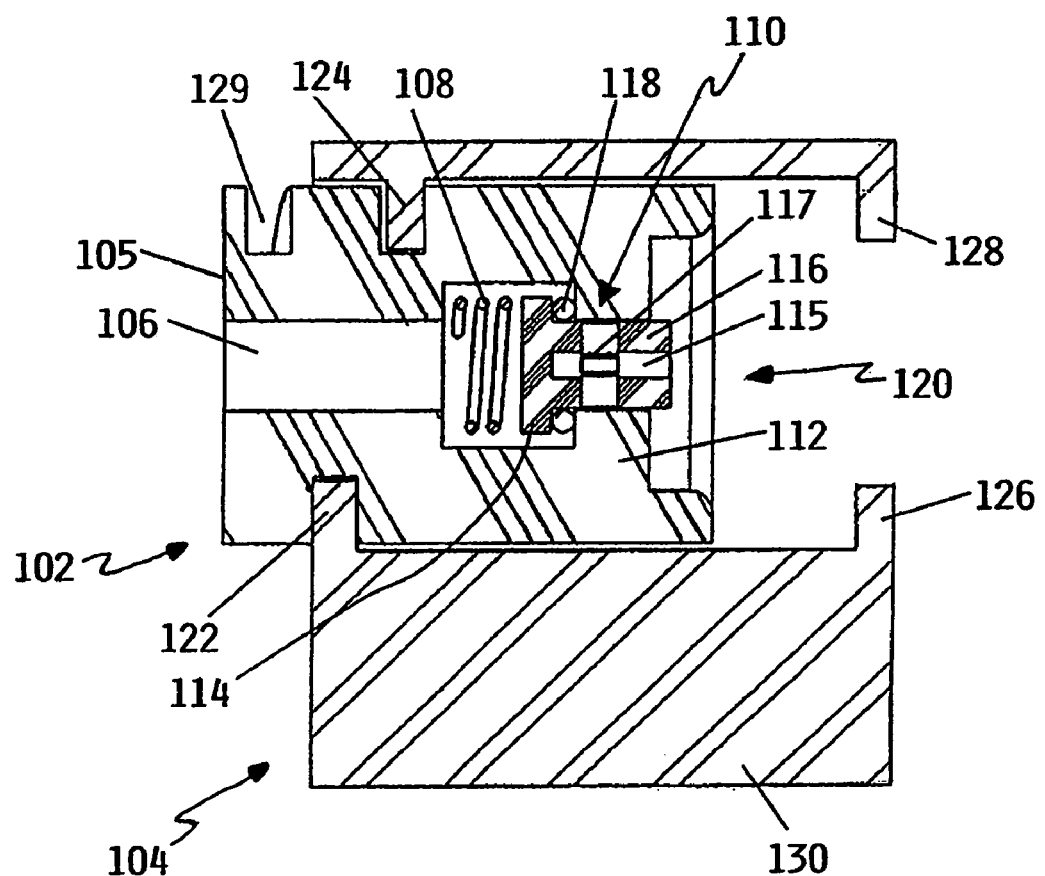
FIG. 1A is a sectional view of a first connector member positioned within a coupling mechanism, in which the cross section is taken through the center of the first connector member.

Referring to FIGS. 1A and 2, a connector system is shown comprising first connector member 102, second connector member 202 and coupling mechanism 104. As discussed below, coupling mechanism 104 can facilitate engagement of first connector member 102 and second connector member 202 to form a connected structure. Generally, each connector member comprises a bore that defines a fluid flow path through the connector member, and a valve moveable between a sealed position and an unsealed position. First connector member 102 and second connector member 202 have structure designed to mate with corresponding structural elements on the coupling mechanism, which facilitates alignment of the connector members within the coupling mechanism. Additionally, actuation of coupling mechanism 104 engages first connector 102 and second connector 202, and establishes fluid communication between first connector 102 and second connector 202. Generally, when engaged, fluid communication is established through the connector members to provide fluid flow, for example, between a fuel cartridge or container and a fuel cell.

Referring to FIG. 1A, first connector member 102 comprises a body portion 105 having bore 106 through body 105 such that a fluid flow path through body portion 105 with a bore 106. First connector member 102 can further comprise resilient member 108 located within bore 106, and valve member 110 biased towards a sealing position by resilient member 108. In some embodiments, bore 106 is formed generally parallel to an axis of first connector member 102. Additionally, bore 106 can further comprise valve seat 112, which defines a stop, or sealed position, for valve member 110 within bore 106. In some embodiments, bore 106 can have a circular cross section, an oval cross section, a rectangular cross section or the like. One of ordinary skill in the art will recognize that no particular cross sectional shape of bore 106 is required by the present disclosure. In addition, the size of bore 106 can be guided by the flow rate requirements and intended application of a particular connector system. Resilient member 108 can be a spring of any appropriate design, an elastic material or the like.

Valve member 110 is movable between a sealed position and an open or unsealed position, and generally functions to regulate fluid flow through bore 106. In some embodiments, valve 110 can be a poppet valve that moves along the axis of bore 106. In some embodiments, valve 110 comprises a flange portion 114, an extension portion 116 and a sealing element 118, which seals flange portion 114 to valve seat 112. Sealing element can be an o-ring or the like. Additionally, valve member 110 can comprise valve bore 115 and passage 117 located within valve bore 115. Generally, passage 117 comprises an opening in the wall of valve bore 115 which permits fluids to flow out of valve bore 115. As shown in FIG. 1, valve 110 is biased towards a sealing position within bore 106 by resilient member 108, such that fluid flow through bore 106 is prohibited unless another force is applied to counteract the force of resilient member 108. In the sealed position shown in FIG. 1, sealing element 118 rests against valve seat 112, and extension portion 116 extends through valve seat 112, which permits extension portion 112 to contact second connector member 202 during engagement of first connector member 102 and second connector member 104. Engagement of first connector member 102 and second connector member 202 is discussed in detail below.

At one end of first connector 102, bore 106 extends to an enlarged bore portion, or recess, 120 which is adapted to receive second connector member 202 during engagement of first connector 102 and second connector 202. As shown in FIG. 1, extension portion 116 of valve 110 extends partially into recess 120, which allow extension portion 116 to contact second connector member 202 when second connector member is inserted into enlarged bore portion 120. In some embodiments, enlarged bore portion 120 can have a circular, oval, rectangular or other selected cross section to engage second connector member. However, the enlarged bore portion will generally be designed to receive at least a portion of second connector member 202 to facilitate engagement of first connector member 102 and second connector member 202.

Body portion 105 of first connector 102 can have a generally cylindrical structure, however, no particular shape is required by the present disclosure. Generally, body 105 of first connector 102 comprises structure adapted to engage with corresponding structure on coupling mechanism 104 to align first connector 102 within coupling mechanism 104. In some embodiments, the structure on body portion 105 of first connector 102 can comprise one or more grooves or channels 129 formed into first connector 102 which are adapted to mate with protrusions formed on coupling mechanism 104. In some embodiments, groove 129 can have a winding, or screw thread design, which moves generally along the major axis of first connector 102, and allows first connector 102 to move a fixed distance as the coupling mechanism is rotated. In some embodiments, the groove(s) 129 on body portion 105 are application specific grooves which are adapted to mate with corresponding structure on a specific coupling mechanism. The application specific grooves permit the coupling mechanism to couple only predetermined connector elements, and thus prohibit the accidental coupling of, for example, fuel containers containing a fuel not compatible with a particular fuel cell or other apparatus.

As described above, coupling mechanism 104 facilitates engagement of first connector member 102 and second connector member 202. In some embodiments coupling mechanism 104 can comprise a generally cylindrical structure having an opening on one side which permits one or both of the connector members to be inserted within the coupling mechanism 104. Additionally, coupling mechanism can comprise handle portion 130 which facilitates actuation of coupling mechanism 104. In some embodiments, the coupling mechanism can rotate to engage the first connector member and the second connector member, while in other embodiments the coupling mechanism can engage the connector members by moving or sliding along an axis generally parallel to the flow path defined by the connector members and locking in place with a catch or other releasable fastener to form an engaged fastener with open valves.

Figure 1B:
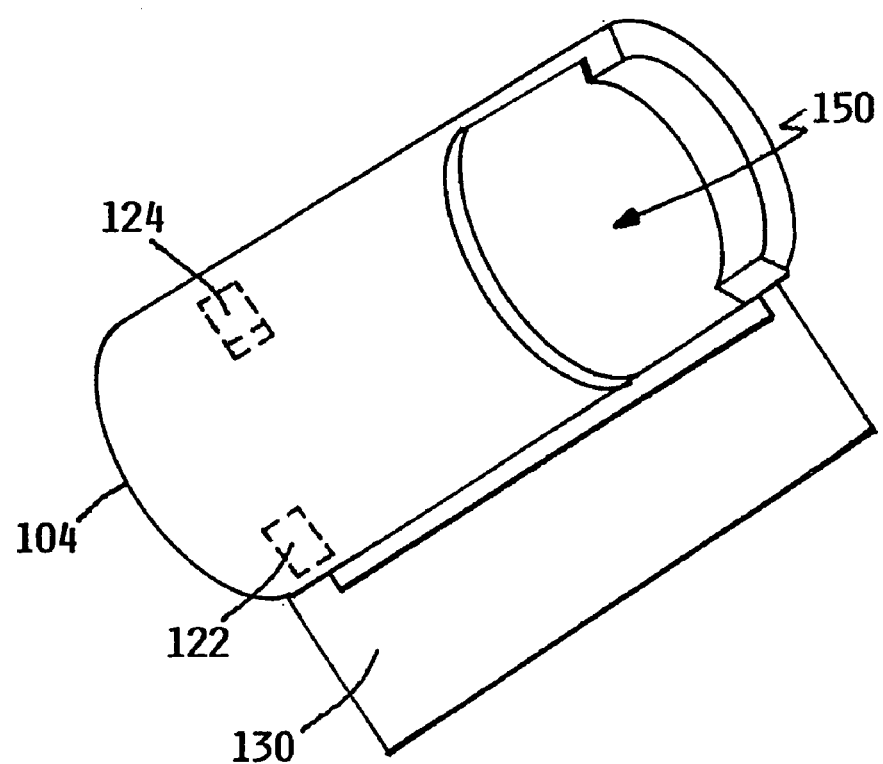
FIG. 1B is a perspective view of an embodiment of a coupling mechanism.

In some embodiments, coupling mechanism 104 further comprises first engagement elements 122, 124 which are adapted to engage with groove 129 on first connector 102 to align first connector 102 within coupling mechanism 104. Additionally, coupling mechanism 104 can also comprise second engagement elements 126, 128 which are adapted to engage corresponding structure on second connector member 202 to position second connector member 202 within coupling mechanism 104. As described above, the first and second engagement elements can be protrusions which mate with corresponding grooves located on the first and second connector members. In some embodiments, the first engagement elements 122, 124 can comprise a screw thread adapted to mate with a winding groove on first connector member 102. One of ordinary skill in the art will recognize that additional engagement element structures exist and are within the scope of the present disclosure. In some embodiments, the coupling mechanism completely encloses, or wraps around, the first connector member, and has an opening which allows the second connector member to be positioned within the coupling mechanism. In other embodiments, the coupling mechanism comprises an opening which permits both the first and second connector members to be inserted within the coupling mechanism. Referring to FIG. 1B, an embodiment of a coupling mechanism 104 is shown wherein coupling mechanism 104 completely encloses first connector member 102. Additionally, as shown in FIG. 1B, coupling mechanism 104 can comprise opening 150 which permits second connector 202 to be inserted into coupling mechanism 104. As shown in FIG. 1C, coupling mechanism 105 can comprise and opening 151 which allows first connector member 102 and second connector member 202 to be inserted within coupling mechanism 105.

With respect to FIG. 2, as described above, second connector member 202 comprises body portion 205 having bore 206 through body 205 such that a fluid flow path through body 205 is defined by bore 206. Second connector member 202 can further comprise resilient member 208 located within bore 206, and valve member 210 biased towards a sealing position within bore 206 by resilient member 208. Generally, bore 206 can be formed parallel to an axis through second connector member 202. As shown in FIG. 2, bore 206 can further comprise valve seat 212, which acts as a stop for valve member 210 when valve member 210 is biased towards a sealed position by resilient member 208. In some embodiments, bore 206 can have a circular cross section, an oval cross section, a rectangular cross section or the like. Additionally, the size of bore 206 will generally be guided by the flow rate requirements and intended application of a particular connection system.

Valve member 210 is located within bore 206 and functions to regulate fluid flow through bore 206. Valve member 210 can be moved between an open or unsealed position and a closed or sealed position. In some embodiments, valve member 210 comprises a flange portion 214, an extension portion 216 and a sealing element 218 which seals flange portion 214 to valve seat 212 when valve 210 is in the sealed position. Additionally, valve member 210 can further comprise valve bore 215 and passage 217 located within valve bore 215. Passage 217 can be an opening in the wall of bore 215 that permits fluids to flow out of valve bore 215. As shown in FIG. 2, when valve 210 is in the sealed position, sealing element 218 rests against valve seat 212, which prohibits fluid flow through bore 206. Additionally, when valve 210 is a sealed position, extension portion 216 extends through valve seat 212 and is generally flush with front end 218 of connector 202. Although FIGS. 1 and 2 show first connector 102 and second connector 202 comprising similar valve structures, in alternative embodiments a first connector can comprises a different valve structure than a second connector. For example, first connector member can comprise a puncturable membrane while second connector member can comprise the valve structure described above, or one or both connector members can comprise a rotating valve element that rotates to an open position due to engagement of a lever arm when the connector members are put together by the coupling mechanism.

In some embodiments, body 205 of second connector 202 can be generally tubular or cylindrical, however, no particular shape is required by the present disclosure. In these embodiments, a portion of body 205 of second connector 202 is adapted to fit into enlarged bore portion 120 of first connector 102 to form a unitary connector structure. As shown in FIG. 2, in some embodiments, body 205 of second connector 202 can comprise channel 220, which holds sealing element 222. Sealing element 222 functions to seal enlarged bore portion 120 when first connector member 102 and second connector member 202 are engaged. In some embodiments, sealing element 222 can be an o-ring or the like. Additionally, body 205 of second connector member can comprises groove 224 which is designed to coupled with engagement elements 126, 128 of coupling mechanism 104 to align second connector 202 within coupling mechanism 104. In some embodiments, groove 224 can be an application specific groove that is adapted to mate with coupling mechanisms having a matched structure. In some embodiments, body 205 of second connector 202 can further comprise flange 228 positioned on the back end 226 of second connector 202 to facilitate attachment of the second connector 202 to a container 230 or the like. Body 205 can also comprise recess 219 in front portion 221 which is adapted to receive extension portion 116 of valve member 110 during engagement of first connector member 102 and second connector member 202. Although extension portion 116 is shown on first connector member 102 and recess 219 is shown on second connector 202, in other embodiments an extension portion of the second connector can fit into a recess formed in the first connector.

In general, the body portions, valves and other components of the first connector, the second connector and the coupling mechanism can be composed of any material suitable for use in fluid transfer applications. Suitable materials include, for example, metals, polymers and combinations thereof. Suitable polymer include, for example, poly (vinyl chloride), high density polyethylene, polycarbonate, poly(ethylene terephthalate), polypropylene, polyurethane, poly(tetrafluoroethylene) and suitable copolymers and mixtures thereof. The resilient members can be a spring or other mechanical structure which can be operably positioned with the bore of a connector member to bias a valve into a sealing position within the bores described previously, the sealing elements of the present invention can be o-rings or the like, and can be composed of any material suitable for fluid transfer applications, such as natural or synthetic rubber or other elastomeric polymer.

Figure 3:
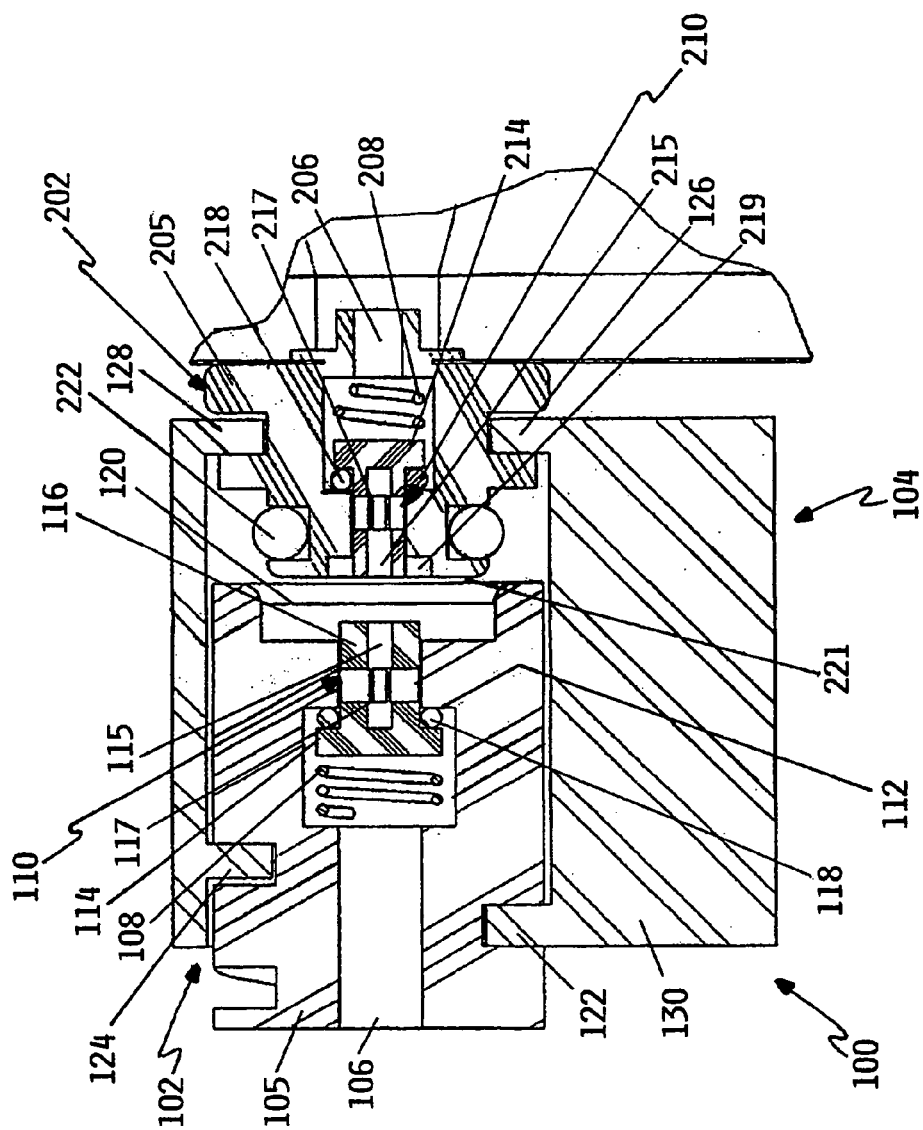
FIG. 3 is a cross sectional view of the first connector member of FIG. 1 and the second connector member of FIG. 2 aligned within the coupling mechanism, the first connector member and the second connector member being in an unengaged position.
Figure 4:
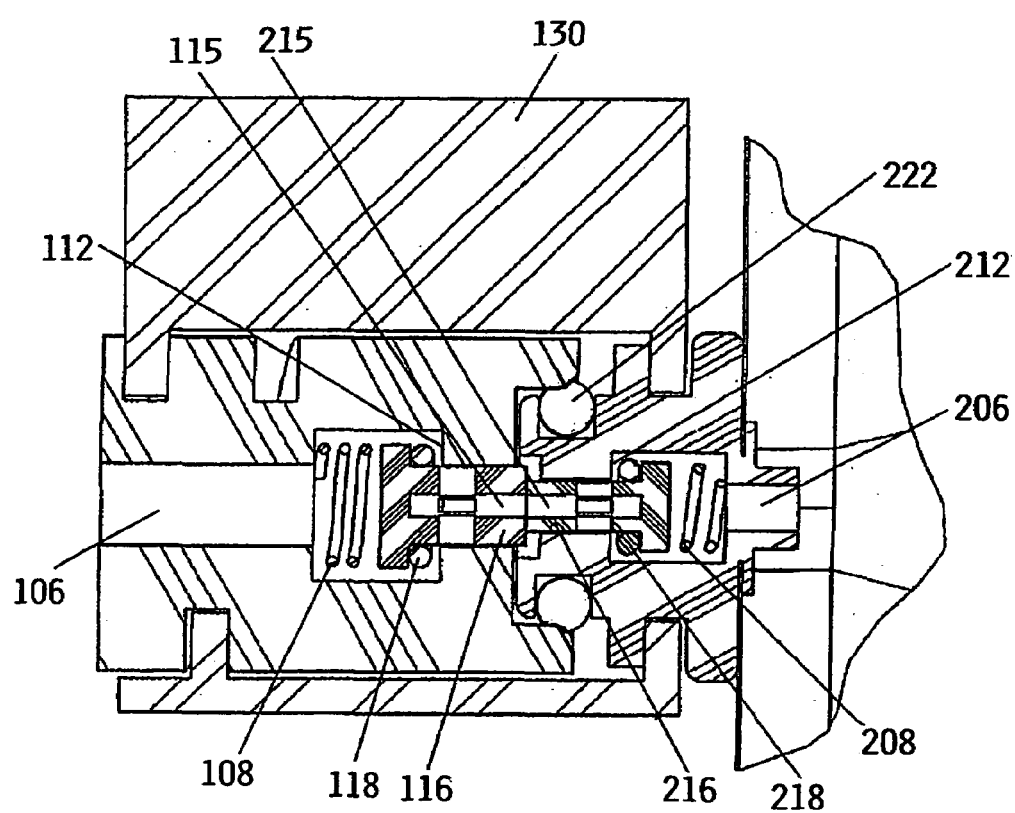
FIG. 4 is a cross sectional view of the first connector member of FIG. 1 and the second connector member of FIG.

With respect to FIGS. 3 and 4, a cross sectional view is shown where first connector 102 and second connector 202 are positioned within coupling mechanism 104. In this embodiment, coupling mechanism 104 wraps around, or encloses, first connector member 102 and second connector member 202 can be inserted into coupling mechanism 104 through the opening located on one side of coupling mechanism 104. As shown in FIG. 3, first engagement elements 122, 124 align with groove 129 on first connector 102, and second engagement elements 126, 128 align with groove 224 on second connector element 202 to position the connector members within the coupling mechanism. As described above, groove 129 can be a winding structure similar to a screw thread design that moves the first connector member a desired distance towards the second connector member during rotation of the coupling mechanism.

As shown in FIG. 4, engagement elements 122, 124 mate with winding groove 129 such that rotation of handle portion 130 rotates first connector member 102 and advances first connector 102 towards second connector 202. A perspective view of engagement element 122 coupled with winding groove 129 is shown in FIG. 1C. In the embodiment shown in FIG. 1C, engagement element 122 can comprise a half screw turn that is adapted to couple with winding groove 129. Referring to FIG. 4, as first connector member 102 is advanced by coupling mechanism 104, front end 221 of second connector 202 is forced into enlarged bore portion 120 of first connector 102, which engages first connector member 102 and second connector member 202. When front end 221 of second connector 202 enters enlarged bore portion 120 of first connector, extension portion 116 of first valve 110 enters recess 219 and contacts extension portion 216 of second valve 210. As extension portions 116, 216 contact each other, the extension portions 116, 216 apply a force against resilient members 108, 208, which moves sealing elements 118, 218 away from valve seats 112, 212 and establishes fluid communication between the first connector member 102 and second connector member 202. Thus, in the unsealed position, fluid can flow through bore 106, around seal 118 and through passage 117 into valve bore 115. Fluid can then flow from valve bore 115 to valve bore 215, through passage 217 and around seal 218 into bore 206. Similarly, when handle 130 is rotated back to the position shown in FIG. 3, the force applied to resilient members 108, 208 by extension portions 116, 216 is reduced as the front end 221 of second connector is disengaged form enlarged bore portion 120. As the force applied to resilient members 108, 208 is reduced, resilient members 108, 208 bias seals 118, 218 against valve seats 112, 212 and prohibit fluid flow through bores 106, 206. Thus, the connector system of the present disclosure allows for simultaneous engagement and unsealing of the connector members, as well as the simultaneous disengagement and sealing of the connector members.

In some embodiments, the first connector 102 can be attached to a fuel inlet port on a fuel cell. Generally, a fuel inlet port provides a fluid flow pathway from the inlet port to the anodes of the fuel cell stack. In some embodiments, the fuel cell can be a portable fuel cell designed for use with portable electronic devices. Fuel cell designed for use with portable electronic devices are described generally in, for example, U.S. Pat. No. 6,387,559 to Koripella et al., entitled "Direct Methanol Fuel Cell System and Method of Fabrication," which is hereby incorporated by reference herein. Additionally, second connector 202 can be attached to a container such as, for example, a fuel container designed for use with a fuel cell. As noted above, fuel containers suitable for use with fuel cells are generally described in U.S. application Ser. No. 10/384,382, entitled "Fuel Storage Container For A Fuel Cell," which is hereby incorporated by reference. The connector members can be reversed with respect to their connections to the fuel cell and fuel container. Also, the connector can be used for other fluid connections, such as a fuel container with a combustion based apparatus or non-fuel based fluid connections.

Referring to FIGS. 5–7, an embodiment is shown where second connector 202 is attached to fuel cartridge 300, and first connector 102 and coupling mechanism 301 are connected to fuel cell 302. In these embodiments, coupling mechanism 301 is coupled to fuel cell 302. In some embodiments, first connector member 102 can be located within coupling mechanism 301, while in other embodiments coupling mechanism 301 can be in contact with first connector member 102. Generally, in fuel cell applications, first connector member 102 is connected to the fuel inlet port of fuel cell 302. Additionally, coupling mechanism 301 is adapted to receive fuel cartridge 300. Thus, in these embodiments, coupling mechanism 301 facilitates engagement of the connector elements, which establishes fluid communication between fuel cartridge 300 and fuel cell 302. In some embodiments, fuel cell 302 can be a direct methanol fuel cell and cartridge 300 can contain methanol or other desired fuel. The orientation of the connector with the fuel cell and fuel container can be reversed in alternative embodiments.

As shown in FIGS. 5A, 5B, 6A and 6B, a fuel cell pack 300 has a fuel cartridge 300.1, a base 300.2, and a fuel cell 302. The fuel cartridge can comprise indentation 304 which is adapted to mate with latch 306 on coupling mechanism 301 to secure cartridge 300 within coupling mechanism 301. In some embodiments, latch 306 can be designed to release cartridge 300 when a suitable force is applied to latch 306. Additionally, cartridge 300 can comprise rib portions 308 which can couple with slots 310 formed into coupling mechanism 301. Keying structures configures as rib portions 308 and slots 310 function as a key system to ensure that only suitable fuel cartridges can be inserted into coupling mechanism 104. In other words, rib portion 308 and slots 310 prevent that accidental introduction of inappropriate fuels into fuel cell 302.

As shown in FIGS. 5–7, in preferred embodiments, the rotation of coupling mechanism 301 engages first connector member 102 and second connector member 202, and also unseals the connector members such that fluid communication between first connector member 102 and second connector member 202 is established. More specifically, rotation of coupling mechanism 301 by about 90 degrees moves connector 202 into contact with first connector 102, which engages the connector members and establishes fluid communication between fuel cartridge 300 and fuel cell 302. In some embodiments, cartridge 300 can comprise structure adapted to mate with corresponding structure on fuel cell 302 to lock cartridge 300, and attached second connector member 202, in the engaged position. In some embodiments, a fuel cartridge receiving portion, or recess, 316 can be attached to the fuel cell 302. As shown in FIGS. 7A and 7B, fuel cell receiving portion 316 can be designed such that when fuel cartridge 300, and coupling mechanism 301, have been rotated to engage the connector members, a surface of fuel cartridge 300 can be flush with a surface of fuel cell 302. In one embodiment, cartridge 300 can comprise flexible member 312 which couples with snap catches 314 located on fuel cell receiving portion 316 to secure cartridge 300, and the associated connector members, in the engaged position.

The embodiments above are intended to be illustrative and not limiting. Although the present invention has been described with reference to particular embodiments, workers skilled in the art will recognize that changes may be made in form and detail without departing from the spirit and scope of the invention.

What is claimed is:

1. A fuel cell system comprising:
   a fuel cartridge comprising a housing, a fuel reservoir therein, and a fuel supply connector on the housing, the connector having a flow passage extending to the fuel reservoir, and a valve within the connector in the flow passage and movable between a closed position where the flow passage is blocked to an open position where the flow passage is not blocked;
   a base with a fuel cartridge receiver and a fluid inlet connector, the fluid inlet connector having a body portion with a flow passage there through, and a valve member positioned within the body portion in the flow passage, the valve member movable from a closed position where the flow passage is blocked to an open position where the flow passage is not blocked, the valve member biased toward the closed position, wherein the fuel cartridge receiver is rotatably attached to the base;
   a fuel cell comprising an anode, a cathode, an inlet, and an outlet; the inlet of the fuel cell in fluid communication with the flow passage of the fluid inlet connector of the base; and
   wherein the fuel cartridge is adapted to engage with the rotatable fuel cartridge receiver on the base and rotate therewith, the fuel supply connector of the fuel cartridge confronting the fluid inlet connector of the base such that rotation of the rotatable fuel cartridge receiver and fuel cartridge causes engagement of the fluid inlet connector and the fuel supply connector and moves the respective valve members of the fuel supply connector and the fluid inlet connector from their respective closed positions to their respective open positions thereby opening fluid flow communication between the fuel cartridge and the fuel cell.

2. The fuel cell system of claim 1 wherein the base further comprises a cartridge receiving region and a detent to secure the fuel cartridge in place at the cartridge receiving region.

3. The fuel cell system of claim 1 further comprising a powered device upon which the fuel cell base is attached.

4. A fuel cell system comprising:
   an electrochemical cell comprising a cathode, an anode and a fuel inlet, wherein the fuel inlet provides a pathway for fuel to the anode;
   a first connector coupled to the fuel inlet, the first connector having a first fluid flow path through the first connector and a first valve having a first valve stem biased towards a sealing position within the first fluid flow path, said first valve openable by axial movement of the first valve stem within the first fluid flow paths; and
   a fuel container comprising a second connector, the second connector having a second fluid flow path through the second connector and a second valve having a second valve stem biased towards a sealing position within the second fluid flow path, said second valve openable by axial movement of the second valve stem in the second fluid flow path;
   a coupling mechanism rotatably attached to the first connector of the electrochemical cell, the coupling mechanism sized to receive the second connector of the fuel container, wherein rotation of the coupling mechanism and the fuel container causes engagement of the first connector and the second connector and axial movement of first and second valve stems with respect to the first and second fluid flow paths thereby establishing fluid communication through the first connector and the second connector.

5. The fuel cell system of claim 4 wherein the coupling mechanism comprises a slot adapted to mate with a rib structure located on the fuel container, wherein the slot and rib structures are positioned based upon the particular fuel.

6. The fuel cell system of claim 4 wherein the coupling mechanism further comprises a latch adapted to mate with corresponding structure located on the fuel container to secure the fuel container within the coupling mechanism.

7. The fuel cell system of claim 4 wherein the fuel container comprises securing elements adapted to engage corresponding elements located on the fuel cell to secure the fuel cartridge in the engaged position.

8. The fuel cell system of claim 4 wherein the second connector further comprises a groove adapted to mate with a protrusion of the coupling mechanism to align the second connector with the coupling mechanism.

9. The fuel cell system of claim 4 wherein the coupling mechanism comprises a hollow generally cylindrical structure.

10. The fuel cell system of claim 9 wherein the coupling mechanism further comprises an opening which allows the fuel container to be inserted within the coupling mechanism.

11. The fuel cell system of claim 4 wherein the first valve, the second valve, or both the first and the second valve comprise a poppet valve.

* * * * *